(12) United States Patent
Prigent

(10) Patent No.: US 6,901,219 B2
(45) Date of Patent: May 31, 2005

(54) METHOD AND DEVICE FOR AUTOMATICALLY CALIBRATING A DIGITIZER

(75) Inventor: Thierry Prigent, Buxy (FR)

(73) Assignee: Eastman Kodak Company, Rochester, NY (US)

(*) Notice: Subject to any disclaimer, the term of this patent is extended or adjusted under 35 U.S.C. 154(b) by 365 days.

(21) Appl. No.: 10/310,388

(22) Filed: Dec. 5, 2002

(65) Prior Publication Data

US 2003/0110002 A1 Jun. 12, 2003

(30) Foreign Application Priority Data

Dec. 6, 2001 (FR) .......................................... 01 15749

(51) Int. Cl.⁷ .......................... H04N 9/11; H04N 5/253
(52) U.S. Cl. ....................... 396/563; 348/97; 348/188
(58) Field of Search ........................ 396/563; 348/96, 348/97, 104, 188; 358/478, 506; 356/443, 444

(56) References Cited

U.S. PATENT DOCUMENTS

| 5,387,929 A | 2/1995 | Collier ........................ 348/97 |
| 5,481,657 A | 1/1996 | Schubert et al. ............ 345/418 |
| 5,563,717 A | 10/1996 | Koeng et al. ............... 358/406 |
| 6,115,062 A | 9/2000 | Milson et al. ................ 348/96 |
| 6,563,531 B1 * | 5/2003 | Matama ...................... 348/96 |
| 2003/0081117 A1 * | 5/2003 | Bogdanowicz et al. ....... 348/97 |
| 2003/0081118 A1 * | 5/2003 | Cirulli et al. ............... 348/104 |

* cited by examiner

Primary Examiner—William B. Perkey
(74) Attorney, Agent, or Firm—David A. Norais

(57) ABSTRACT

The present invention is in the technical field of image digitizers or scanners. It relates to a method and device that enables the automatic calibration of digitizing equipment. The method and device of the invention enable the auto-calibration of a digitizing device by taking into account sensitometric data specific to a film strip to be digitized, to automatically adjust the digitizing parameters of the digitizing device, according to these sensitometric data and without operator intervention. The application field of the invention more especially relates to the users of digitizing equipment dedicated to motion picture films.

12 Claims, 4 Drawing Sheets

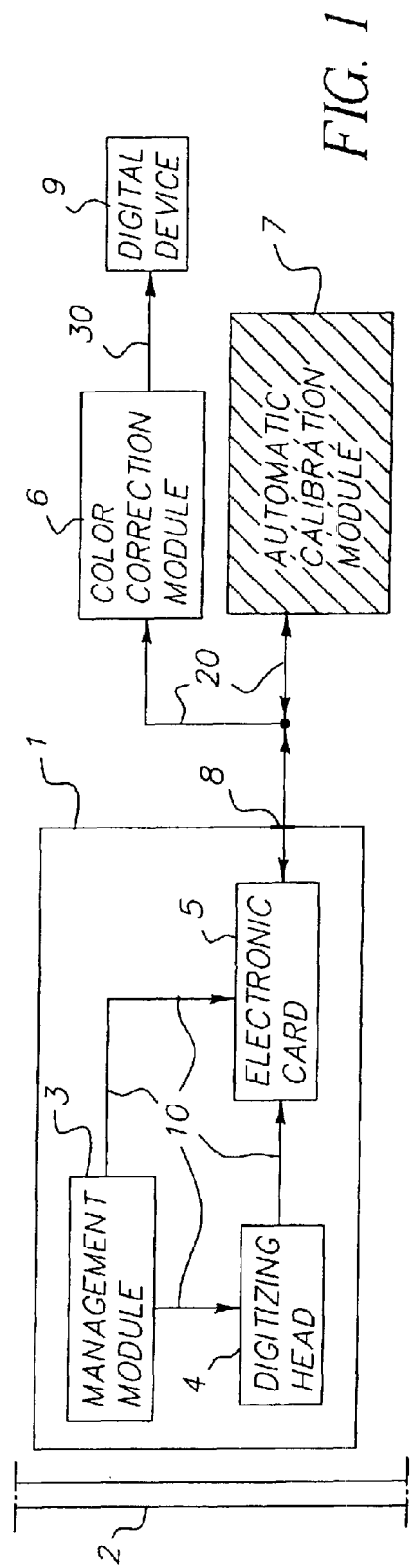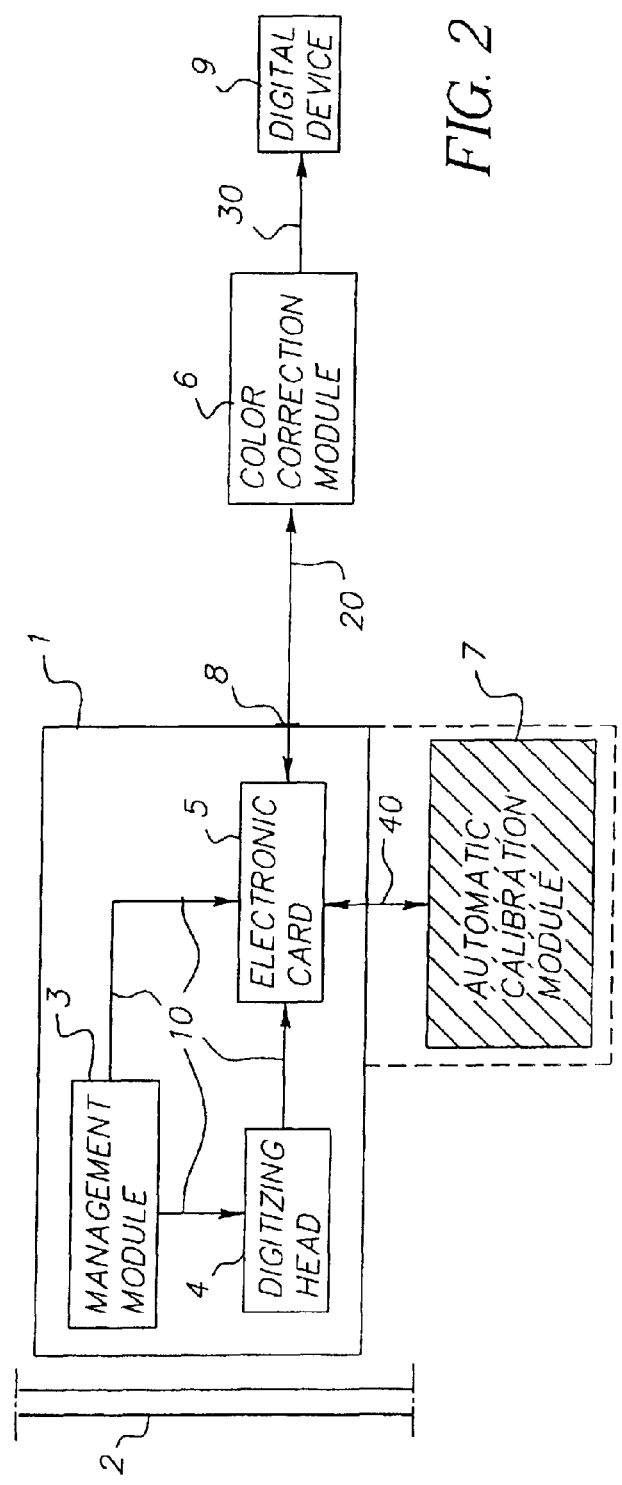

METHOD AND DEVICE FOR AUTOMATICALLY CALIBRATING A DIGITIZER

This is a U.S. original application which claims priority on French patent application No. 0115749 filed Dec. 6, 2001.

FIELD OF THE INVENTION

The present invention is in the technical field of digitizers or scanners. It relates to a method and a system for automatically calibrating digitizing equipment used in the photographic industry, and specifically digitizing equipment (film scanners) dedicated to motion picture films.

BACKGROUND OF THE INVENTION

U.S. Pat. No. 5,874,988 describes a system and a method for automatically correcting the colors in a film scanner. This patent describes how correction is performed by managing statistical parameters linked to a source image and by comparing these statistical parameters with those of a reference image, with the reference image data being memorized. The statistical parameters are the gain, the gamma-factor and the black level. Correction is performed until the adjustment is optimized between the reference image parameters and the statistically determined parameters of the objective to be achieved for the source image. This patent, for adjusting film scanner colors, is based on the statistical analysis of the pixels between two images, one source image and one reference image; it does not take into account sensitometric measurements made on the film strip to be digitized.

U.S. Pat. No. 6,115,062 describes a system and a method for calibrating a film scanner using a reference film strip with known optical densities. The gain, gamma and black level are adjusted in relation to this calibrated reference strip with preset optical density levels and corresponding to three different gray levels. For the film scanner to be correctly adjusted, the video signal or output voltage must match the optical densities of the three preset gray levels. This patent does not take into account sensitometric measurements made on the film strip to be digitized.

It is especially useful to optimize the calibration methods of digitizing equipment, in particular in the field of the motion picture industry. The objectives of quality and cost, and thus of productivity linked to this industry involve using reliable and fast digitizing equipment, capable of adapting to all types of film to be digitized.

SUMMARY OF THE INVENTION

The present invention provides a rapid and automated method for calibrating digitizing equipment (film scanners) that achieves these objectives, by taking into account sensitometric data of the film to be digitized and not depending on operator intervention.

The present invention more especially relates to a method for automatically calibrating a digitizing device for photosensitive film comprising the following steps:

a) place in the digitizing device, a photosensitive film strip comprising at least one sensitometric calibration patch;

b) detect at least one sensitometric calibration patch of the film strip;

c) digitize at least one sensitometric calibration patch of the film strip;

d) determine the pixel digital data of the at least one sensitometric calibration patch;

e) determine, according to the pixel digital data determined in step d), the optical density values of the points of at least one sensitometric curve specific to the film strip; and f) adjust the digitizing parameters of the digitizing device by bringing about the transformation, into coded values, of the optical density values of all the points of the sensitometric curve specific to the film strip, in the range of coded values of the optical density of the digitizing device, and by filling practically all the range.

The present invention also relates to a digitizing device for photosensitive film comprising an automatic calibration module for the digitizing parameters of the device, wherein the calibration module transforms, into coded values, the optical density values of all the points of a sensitometric curve specific to the film strip, in the range of the coded values of the optical density of the digitizing device.

Other characteristics and advantages of the invention will appear on reading the following description, with reference to the drawings of the various figures.

BRIEF DESCRIPTION OF THE DRAWINGS

FIG. 1 represents diagrammatically a hardware environment of a first embodiment of the system according to the invention;

FIG. 2 represents diagrammatically a hardware environment of a second embodiment of the system according to the invention;

DETAILED DESCRIPTION OF THE INVENTION

Figure 3:
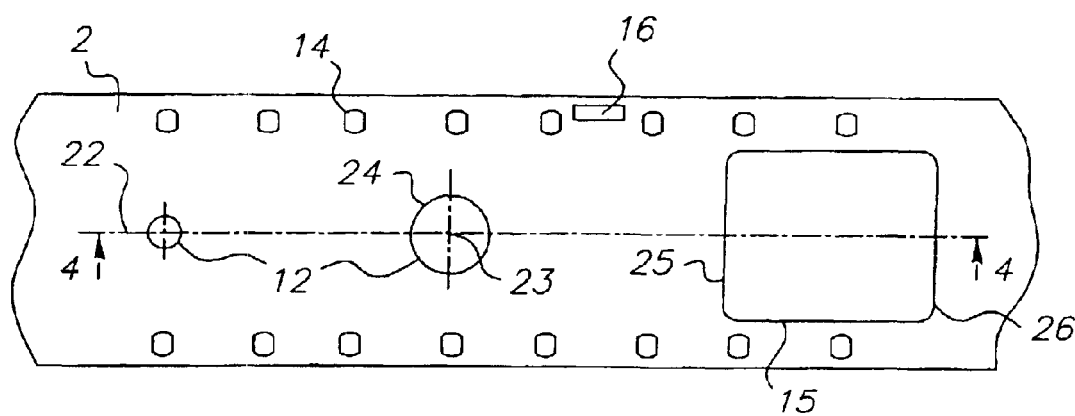
FIG. 3 represents an example of an emulsion-coated photosensitive film strip comprising at least one sensitometric calibration patch.

The implementation of the automated method of the invention, called auto-calibration, ensures consistency of digitizing results between different digitizing equipment, especially for color films. In addition, this method enables the successive digitizing of film types that are different in their sensitometric characteristics, whether in black and white or color. The auto-calibration of digitizing equipment implemented by the method and device of the present invention optimizes the digitizing of an emulsion-coated photosensitive film, by using all the sensitometric characteristics of the film. One of the major advantages of the invention is to enable the automatic digitizing, for example in sequence, of the images of a photosensitive film strip. The present invention especially enables the digitizing of film strips with different sensitometric characteristics, assembled end to end, and forming the same reel of film. The present invention thus enables the automatic setting or adjustment of the calibration of the digitizing parameters (gain, gamma and black level) of digitizing equipment, to automatically modify the exposure to light of a film in the device, taking into account the sensitometric data specific to each strip to be digitized. The digitizing is thus performed without operator intervention to execute adjustments of the digitizing equipment during the digitizing; thus adjustment errors or personalization due to the operator are prevented, while sensitometric data specific to each film strip to be digitized are integrated.

The following is a detailed description of the embodiments of the invention, with reference to the drawings in which the same numerical references identify the same or corresponding elements in each of the different figures.

The present invention is implemented in the hardware environment represented by FIGS. 1 and 2. Digitizing equipment, digitizing device or digitizer 1 comprises the following components: a digitizing management module 3, a digitizing head 4, and at least one electronic or management card 5 for managing the control and processing of the digitizing. The digitizing equipment 1 also comprises components equipped for example with CCD sensor type transfer devices or photomultipliers, known to those skilled in the art. The electronic card 5 for managing the digitizing manages the digitizing of images of shots recorded on a photosensitive film strip 2 to be digitized. Links 10, internal to the digitizing device 1, enable the communication of digital data corresponding to the digitized images, between the management module 3, the digitizing head 4 and the electronic card 5. Links 10 also enable the communication of digital set points and/or synchronization signals between the components 3, 4 and 5. The digitizing device 1 is, for example, a film scanner used in the motion picture field. The management electronic card 5 communicates output digital data from the device 1, by links 20, to a color correction module 6, and to an automatic calibration module 7. These digital data comprise the digital data that correspond to the digitized image. The calibration module 7 comprises a program for automatically performing the calibration of the digitizing equipment 1. The calibration module 7 also called auto-calibration module 7 prepares and communicates its orders to the digitizing device 1, using protocols provided for this purpose. The links 20 enable the communication of image digital data, through output 8 of the digitizer. The color corrector 6 communicates for example, by link 30, the image digital data to a device 9. The device 9 is, for example, a digital viewing monitor, or a device for memorizing the data.

According to a first embodiment, the invention is implemented in an environment represented by FIG. 1. This configuration is a standard means that is not dependent on the manufacturer or the type of digitizer 1. In this embodiment, known digitizing standards are used, i.e. using standardized file formats. Thus, for example, the following are used: video standards CCRI 601-1 (International Radio Central Committee) and SMPTE 296 M HD (high definition), the standards SMPTE 248 and SMPTE 274 (output interface), or any other recognized standard available. In this embodiment, a certain number of output bits is received from the digitizer 1; and this number of output bits, determined by the standard, is for example 10 bits.

According to FIG. 2, a second embodiment of the implementation of the invention corresponds to a specific configuration enabling a direct connection, by link 40, of the calibration module 7 with the internal components 3, 4 and 5 of the digitizer 1, and before the output 8 of the digitizer 1. This configuration provides for improved accuracy of the calculation management of the auto-calibration parameters, between the electronic card 5 and the calibration module 7. For example, 14 bits are communicated, by the digital link 40, between the calibration module 7 and the management card 5.

The auto-calibration module 7 can be included in the digitizing device 1, or stay independent outside the digitizing device 1. In the latter case, the auto-calibration module can be included in a computer equipped with suitable interfaces for communicating image digital data with the digitizing device 1. The auto-calibration module 7 enables the setting or adjusting of the digitizing parameters of the digitizing device 1, i.e. the gain, gamma and black level or lift. These parameters are explained below.

Figure 4:
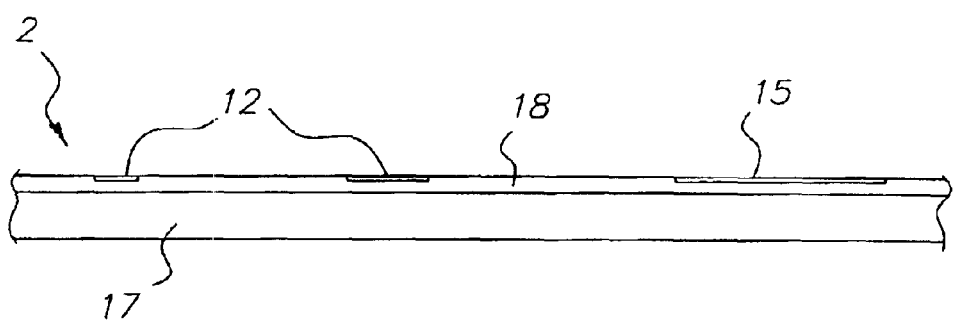
FIG. 4 represents a cross-section made according to line 4—4 of FIG. 3.

According to the FIGS. 3 and 4, a film strip 2, for example, motion picture film, comprises a support 17, an emulsion layer 18 sensitive to light exposure, and at least one sensitometric calibration patch 12, 15. The sensitometric calibration patch 12, 15 is placed on the film strip 2, preferably at a place different than the locations of the shot images recorded on the film strip 2. However, in a downgraded embodiment, the sensitometric calibration patch 12, 15 can also be placed in an image location recorded on the film strip 2. The calibration patches are spaced regularly along the axis 22 of the film strip 2. In a preferred embodiment of the invention, the sensitometric calibration patches 12 are, for example, placed at the start of the film strip 2, before the recorded images, and spaced by a distance corresponding approximately to the distance separating, for example, four successive perforations 14 of the film strip 2, in the case of the most commonly used format used, i.e. 35 mm.

The sensitometric calibration patch of the film strip 2 has, for example, a circular shape (patch 12); its optical density varies between two known values, between the center of the circle 23 forming the sensitometric calibration patch and the line 24 forming the perimeter of the circle. If the sensitometric calibration patch of the film strip 2 has, for example, a shape corresponding approximately to the location of an image 15 on the film strip 2, the optical density varies between two known values, between a first edge 25 and a second opposite edge 26 of the sensitometric calibration patch 15. When several sensitometric calibration patches 12, 15 are used successively along the axis 22 of the film strip 2, the values of the ranges of known different optical densities are determined for each of the successive sensitometric calibration patches. It is clear that any other location of the sensitometric controls on the film strip 2 and any other geometric shape of sensitometric calibration patch (e.g. polygonal) can be envisaged and implemented by the method of the invention. It is also obvious that the sensitometric calibration patches can be identical both in exposure and geometric shape.

Figure 5:
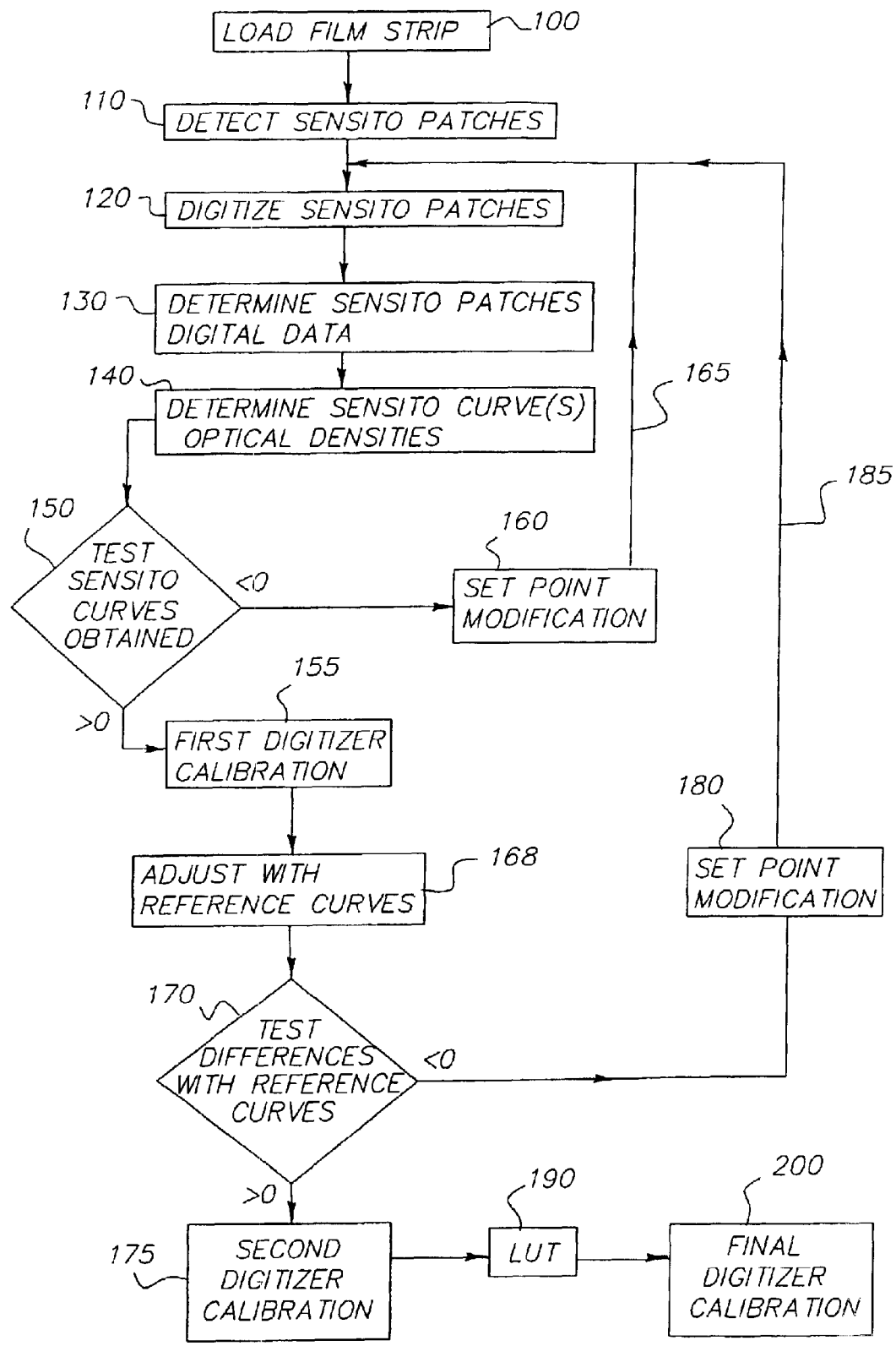
FIG. 5 represents a diagram of the implementation of the method of the invention.

FIG. 5 represents successive operations of the implementation of the method of the invention. All these operations are automatically sequenced by the execution of the instructions of a control program. An operation or step 100 is the placing or loading in the digitizing device 1, of a film strip 2 comprising at least one sensitometric calibration patch in its emulsion. Operation or step 110 detects the sensitometric calibration patch(es) 12, 15 placed on the film strip 2. Detection of the sensitometric calibration patch 12, 15 is performed by shape recognition, carried out, for example, during the start of the digitizing operation of the film strip 2. The sensitometric calibration patch 12, 15 of the film strip 2 is then digitized, operation or step 120. The method of the invention determines, during digitizing of the sensitometric calibration patch, the pixel digital data of the calibration patch. According to the operation or step 130, these digital data are, for example, saved in a file. According to the operation or step 140, the method, according to the pixel digital data determined during the operation 130, by reconstituting them point by point, determines at least one sensitometric curve specific to the film strip 2. This advantage of the present invention is noted as follows: the sensitometric curve(s) correspond(s) to the emulsion of the sensitometric calibration patch that is the same emulsion as that of the film strip 2; consequently, the actual sensitometric curve (s) of the film strip 2 to be digitized is (are) determined. Clearly several sensitometric curves are determined, if the film strip 2 is, for example, a color film: one sensitometric curve is determined for each of the respective layers, red, green and blue. If, for example, the sensitometric calibration patch is represented by several spots of the type 12, each of the spots 12 represents all or part of the sensitometric curve.

Figure 6:
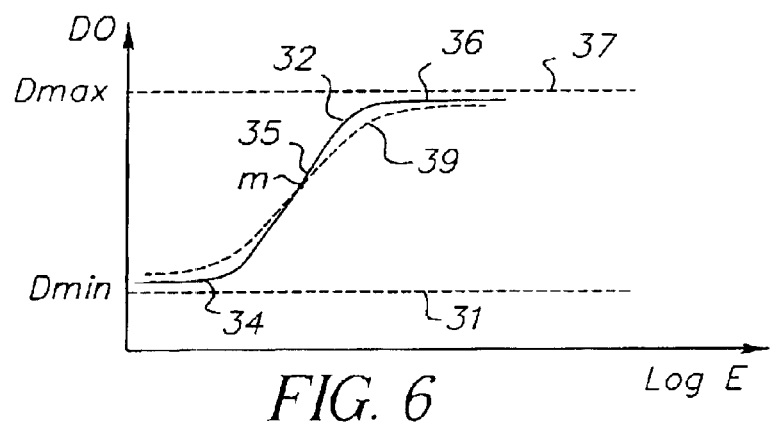
FIG. 6 represents a diagram of the optical densities corresponding to sensitometric curves, as a function of the exposure.

According to FIG. 6, a sensitometric curve 32 is represented diagrammatically in an orthogonal system with Log E for abscissa and OD as ordinate. Log E is, in a logarithmic space, the emitted light exposure on the film strip and OD is the resulting optical density. The sensitometric curve 32 has one practically horizontal part 34, called curve foot, which approaches an asymptote 31 corresponding to the Dmin (minimum optical density); Dmin is a first characteristic of the film strip 2. The part 34 corresponds to low illuminations of the film, i.e. to a zone of the curve 32 for which the film does not react when the exposure is increased. Conversely, a practically horizontal part 36 of the curve 32, approaches an asymptote 37 corresponding to the Dmax (maximum optical density), and corresponds to strong exposure, for which the film is near saturation. Dmax is a second characteristic of the film strip 2. Between the two practically horizontal parts 34 and 37, the curve 32 is represented by a practically linear shape 35. The sensitometric curve 32 represents the response of a given film strip 2 to illumination (light exposure). The slope of the curve 32 at the point M, characterizing the middle of the part 35, represents a third characteristic of the film strip 2, as the region of the curve 32 around the point M corresponds to the practical use of the film.

Figure 7:
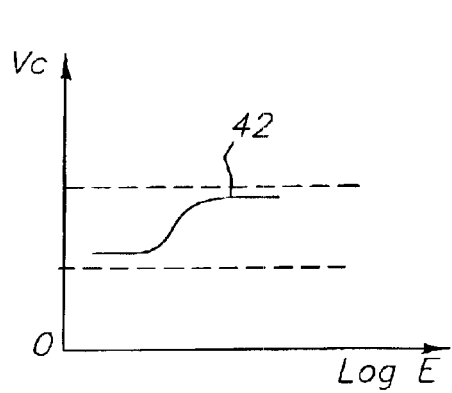
FIGS. 7 and 8 represent diagrams of the coded values of optical density, as a function of the exposure.
Figure 8:
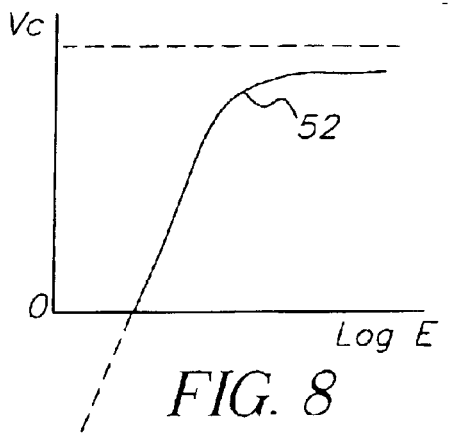
Figure 9:
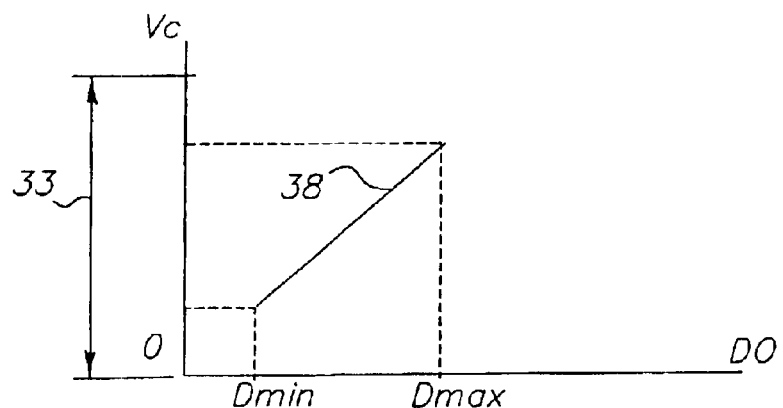
FIG. 9 represents a diagram of the coded values of optical density as a function of the optical densities.

The program associated with the digitizing device, from the optical density values, transforms, according to FIGS. 7 to 9, the optical density values into coded digital values Vc. All the coded values (Vc) are coded, for example, on a scale of 10 bits and represent, for example, 1024 different values, coded from 0 to 1023, and that correspond to different gray levels. A coded value corresponds to each optical density; which is according to a transformation of the type: $y=(A.x+B)^G$. In a preferred embodiment, the value of gamma (G) is one. Consequently, the previous equation is similar to the equation of a straight line 38 (FIG. 9); an equation of the type: $y=A.x+B$. In the graphic representation of this equation in an orthogonal system, and according to FIG. 9, the optical density values are on the abscissa (x) and the coded values Vc on the ordinate (y). One of the objects of the present invention is to align the parameters A, B and G (gamma), so that the transformation, into coded values, of the optical density values of all the points of the sensitometric curve specific to the film strip is contained within the range of the coded values (by the axis Vc) of optical density of the digitizing device 1; for example, in the range of the 1023 possible digital values, by the axis Vc. In other words, no optical density value corresponding to a film sensitometric curve, can be coded out of the range 33 (FIG. 9) of the coded values going, for example, from 0 to 1023. When parameter A is varied, the gain of the transformation of the optical densities into coded values is varied; when B is varied, the black level (or lift) is varied; and when the gamma is varied, the straightness of the curve 38 is varied. The method of the invention automatically adjusts these digitizing parameters (gain, gamma and lift), so that all the optical density values, transformed into coded values, and corresponding to all the points of the sensitometric curve of the film strip 2, are contained in the range 33 of the coded values (Vc) of optical density of the digitizing device 1.

From the determination in step 140 (FIG. 5) of the sensitometric curve specific to the film strip 2, the morphology of the sensitometric curve obtained is tested against the Dmin and Dmax values of the curve. An object of the method of the invention is to adjust the digitizing parameters of the digitizing device 1, i.e. to automatically adjust the gamma, gain and lift so that the transformation of the optical density values of all the points of the sensitometric curve 32, obtained during step 140, is contained in the range 33 (FIG. 9) corresponding to the scale of the coded values of the digitizing device 1, and practically fill all the range 33.

A test at step 150 performed on a curve with the morphology of the curve 32 gives a positive result, as the coded values of all the optical density values of the curve are contained in the range 33 and practically fill all the range 33. This positive test result thus means no adjustment of the parameters (gamma, gain and lift) of the digitizing device 1 is required. Practically it may be considered that the adjustment of the digitizing device is correct if the range 33 is filled to at least 90% of the range 33. However, if the test 150 is performed on curves of the type 42 or 52, the test result is negative. The sensitometric curve 42 has morphology that is incompatible with the adjustment of the digitizing device, which generates too much inaccuracy in relation to the digitizing result. The sensitometric curve 52, which is incompatible with the limits of the range 33 corresponding to the interval of the optical density values between Dmin and Dmax of the curve, also means a negative test result. If the test result is negative, the program generates a first modification of the set points at step 160, enabling according to the loop 165, restarting of the digitizing process 120 leading to the adaptation of the adjustment of the digitizing device to the morphologies of the sensitometric curves. These set point modifications, based on automation programming strategies, are performed by the program according to the optical density values obtained, and thus lead to a first adjustment of the digitizing parameters. The process is restarted from the digitizing operation 120, according to a loop 165, once or several times if necessary, by iteration, until the test result 150 is positive. Thus a first automatic adjustment 155 is achieved, corresponding to a first calibration of the digitizing parameters of the device 1.

An embodiment of the of the method of the invention also enables, after having performed the first type of adjustment of the digitizing parameters described above, more refinement by adjusting at step 160 the parameters obtained after the first adjustment at step 155, to approach, for example, the points of a known reference sensitometric curve. This known reference sensitometric curve can be a sensitometric curve specific to the same type of film as that of the film strip 2 to be digitized, or a different sensitometric curve, in relation to which adjustment in a specific context for example is required.

The invention device reads, on the film strip 2 to be digitized, data 16 (FIG. 3) specific to the film strip, and auto-calibrates according to these data 16. The data 16 specific to the film characterize the film type and especially its sensitometric characteristics in relation to a reference sensitometric curve 39 (FIG. 6). These data are advantageously encoded in the form of a barcode and placed for example on the edge of the film strip 2. The data are read for example by a barcode reader linked to the digitizing device 1. The choices of reference sensitometric curves 39 are previously programmed in relation to the various film types capable of being digitized. A second test 170 is performed to measure the differences between the curve obtained (e.g. 32), following the first adjustment 155, and the curve 39 selected as reference. If the differences between the two curves are too great (outside preset differences), a new modification of the set points at step 180 is performed, according to the loop 185, to restart the process from the digitizing operation 120, by iteration, until the test result 170 is positive. Thus a second automatic adjustment 175 is achieved, corresponding to a second calibration of the digitizing parameters of the device 1, which is added to the first adjustment 155.

Another variant of the previous embodiment also enables even finer adjustment of the first and/or second calibration obtained, by using, for example, a transformation table of digital values or LUT 190 (look up table). The calibration program determines the LUT in the digitizing device 1. These LUTs are generally calculated according to the relationship between the data of the sensitometric curve of the film strip 2 to be digitized and the reference curve. This LUT increases the number of adjustment possibilities. The LUT for a color film can be, for example, a table with three inputs (red, green and blue) coded for example on 10 bits, and three outputs (red, green and blue); each of the table's outputs results from a programmed transformation of the input values.

Thus a final calibration 200 of the digitizer 1 is achieved.

The invention has been described with reference to the preferred approaches, but it is clear that the present patent application covers all variants that can be made and which correspond with the present invention. Accordingly, such approaches are for illustration and do not restrict the claimed protection.

What is claimed is:

1. A method to automatically calibrate a digitizing device for photosensitive film, the method comprising the steps of:
    a) placing a photosensitive film strip in a digitizing device, the photosensitive film comprising at least one sensitometric calibration patch;
    b) detecting at least one sensitometric calibration patch of the film strip;
    c) digitizing the at least one sensitometric calibration patch of the film strip;
    d) determining pixel digital data of the at least one sensitometric calibration patch;
    e) determining, according to the pixel digital data determined in said step d), values of an optical density of points of at least one sensitometric curve specific to the film strip; and
    f) adjusting digitizing parameters of the digitizing device by bringing about a transformation, into coded values, of the optical density values of all the points of the sensitometric curve specific to the film strip, in a range of coded values of optical density of the digitizing device, and by filling practically all said range.

2. The method of claim 1 wherein, after the step of determining the optical density values of the sensitometric curve specific to the film strip, from the digitizing step of the sensitometric calibration patch, the digitizing parameters of the device are automatically adjusted, by iteration, until the transformation of the optical density values of all the points of the sensitometric curve specific to the film strip is contained in and fills practically all the range of the coded values of optical density of said device.

3. The method according to claim 2, wherein the transformation of the optical density values of all the points of the sensitometric curve obtained and specific to the film strip fills the range of the coded values of optical density of the digitizing device to at least 90%.

4. The method according to claim 1, wherein a line forming the sensitometric curve specific to the film strip is further adjusted automatically to approach the points of a reference sensitometric curve.

5. The method according to claim 4, wherein the digital data of the reference sensitometric curve are memorized in the digitizing device.

6. The method according to claim 4, wherein the automatic adjustment of the line forming the sensitometric curve specific to the film strip in relation to a reference sensitometric curve is performed using a color look-up table.

7. A digitizing device for a photosensitive film strip comprising:
    an automatic calibration module of digitizing parameters of said device, wherein said calibration module adjusts a transformation, into coded values, of optical density values of all points of a sensitometric curve specific to the film strip, in a range of the coded values of optical density of the digitizing device.

8. The digitizing device according to claim 7, wherein the calibration module adjusts a black level of said device.

9. The digitizing device according to claim 7, wherein the calibration module adjusts a gain of said device.

10. The digitizing device according to claim 7, wherein the calibration module adjusts a gamma of said device.

11. The digitizing device according to claim 7, wherein the film strip to be digitized includes data specific to the film, said data specific to the film enabling a determination of at least one reference sensitometric curve of said film.

12. The digitizing device according to claim 11, wherein the data specific to the film strip to be digitized are barcode data encoded on said film strip, said data being intended to be read by a reader linked to the digitizing device.

* * * * *